United States Patent
Rueby

(10) Patent No.: US 8,408,669 B2
(45) Date of Patent: Apr. 2, 2013

(54) EFFICIENT DATA SCANNING FOR PRINT MODE SWITCHING

(75) Inventor: Christopher Rueby, North Chili, NY (US)

(73) Assignee: Eastman Kodak Company, Rochester, NY (US)

( * ) Notice: Subject to any disclaimer, the term of this patent is extended or adjusted under 35 U.S.C. 154(b) by 363 days.

(21) Appl. No.: 12/828,338

(22) Filed: Jul. 1, 2010

(65) Prior Publication Data

US 2012/0001975 A1    Jan. 5, 2012

(51) Int. Cl.
 *B41J 29/38* (2006.01)
(52) U.S. Cl. ............................................. 347/14; 347/15
(58) Field of Classification Search ................ 347/14, 347/15
See application file for complete search history.

(56) References Cited

U.S. PATENT DOCUMENTS

| 5,600,353 | A | * | 2/1997 | Hickman et al. ............... 347/43 |
| 6,257,698 | B1 | | 7/2001 | Bloomberg et al. |
| 2002/0109750 | A1 | * | 8/2002 | Brown et al. ................... 347/37 |
| 2007/0013925 | A1 | * | 1/2007 | Ishikawa ........................ 358/1.7 |
| 2007/0188588 | A1 | * | 8/2007 | Shimomura .................. 347/233 |

* cited by examiner

*Primary Examiner* — Laura Martin
(74) *Attorney, Agent, or Firm* — Kevin E. Spaulding

(57) ABSTRACT

A method for printing images on an inkjet printer having grayscale print and color print modes, comprising performing an inspection process to inspect lines of image data in an inspection region downstream from a current swath of image data to determine a print mode for a future swath of image data. The inspection process includes inspecting the lines of image data in the inspection region according to a predetermined inspection sequence, determining whether an inspected line contains any pixels to be printed with color ink, and if so terminating the inspection process and designating that the future swath is to be printed with the color print mode; otherwise, if none of the lines are found to contain any pixels to be printed with color ink, designating the future swath to be printed with the grayscale print mode.

13 Claims, 11 Drawing Sheets

EFFICIENT DATA SCANNING FOR PRINT MODE SWITCHING

FIELD OF THE INVENTION

The present invention generally relates to a method of preparing an image for printing in multiple printing passes, and more particularly to a method of scanning print data to decide which of a plurality of print modes should be used to print a portion of a page.

BACKGROUND OF THE INVENTION

An inkjet printing system typically includes one or more printheads and their corresponding ink supplies. Each printhead includes an ink inlet that is connected to its ink supply and an array of drop ejectors, each ejector consisting of an ink pressurization chamber, an ejecting actuator and a nozzle through which droplets of ink are ejected. The ejecting actuator may be one of various types, including a heater that vaporizes some of the ink in the pressurization chamber in order to propel a droplet out of the nozzle, or a piezoelectric device which changes the wall geometry of the chamber in order to generate a pressure wave that ejects a droplet. The droplets are typically directed toward a receiver (e.g., paper or some other recording medium) in order to produce an image according to print data that is converted into electronic firing pulses for the drop ejectors as the recording medium is moved relative to the printhead.

A common type of inkjet printer architecture is the carriage printer, where the printhead nozzle array is somewhat smaller than the extent of the region of interest for printing on the recording medium and the printhead is mounted on a carriage. In a carriage printer, the recording medium is advanced a given distance along a media advance direction and then stopped. While the recording medium is stopped, the printhead carriage is moved in a lateral direction that is substantially perpendicular to the media advance direction as the drops of ink are ejected from the nozzles. After the carriage has printed a swath of the image while traversing the recording medium, the recording medium is advanced; the carriage direction of motion is reversed, and the image is formed swath by swath.

Image quality of the print can be improved by printing with multiple passes of the printhead. In multi-pass printing the printhead prints a portion of the full number of dots that are required. At the end of the swath, the recording medium is advanced by a distance that is less than the length of the printhead nozzle array. For example, in 2-pass printing, in each of two printing passes, approximately half of the required dots would be printed, with an advance of the recording medium of half the length of the printhead nozzle array being done between the two passes. Advantages of multi-pass printing include the ability to compensate for malfunctioning jets by sharing the printing of raster lines of data by two or more different nozzles; the ability to disguise nonuniformities in the advance of the recording medium between swaths; the ability to avoid adverse interactions between ink droplets of different colors deposited in close proximity on the recording medium; and the ability to deposit more than one drop of ink per pixel location for greater color intensity as needed. In some applications, image quality can be improved by having up to seven or more passes to print a given region of the image. However, in general, the more passes used to print an image, the longer time is required to print the image, so that printing throughput decreases as the number of passes increases.

In order to print images at the level of image quality required by the user, but without unnecessarily sacrificing printing throughput, a number of print modes are generally provided for the printer. Each print mode includes how many passes are to be used, as well as image processing algorithms for how to arrange the printing of dots in each pass. In some instances, the different print modes can be selected by the user. In other instances, the print driver or printer software automatically selects a print mode with good trade-offs, depending on the type of recording medium, and perhaps the type of image being printed.

Some types of images include regions having only black printing (e.g., for normal text printing), as well as other regions having color printing (e.g., for pictures, charts, highlighted text, etc.). In some applications it is found that good quality printing of black only (e.g. for text) can be printed in fewer passes than are required for good quality printing of color portions of the image. In order to provide good quality printing of such images at relatively high printing throughput, it is known in the art to switch between print modes within a single page depending upon the print data (image data) to be printed in an upcoming swath or swaths.

U.S. Pat. No. 5,600,353 discloses switching between different print modes for black and for color printing within a single page. Transitions between different print modes are described for example in a premium mode where 4-pass printing is done for color and 3-pass printing is done for swaths including only black print data. U.S. Pat. No. 6,257, 698 discloses changing the setting of a print density filter for an auto mode switching algorithm.

A comparison of FIGS. 1 and 2 can help provide an understanding of the throughput improvements that are possible using print mode switching using methods known in the prior art. FIG. 1 represents printing a document entirely with 2-pass printing with no print mode switching, while FIG. 2 represents printing the same document and switching between 2-pass printing for swaths including color print data and one-pass printing for swaths including only black print data. At the left of each of these two figures, an exemplary page 100 is shown including a first region having only black text 102, a second region having a colored logo 105, and a third region of colored text 110 (for example, a signature).

Given that a particular line of print data must be printed with a single print mode, it can be seen that the page can be divided into two colored print data regions 120 that must be printed with a color print mode, and a grayscale print data region 125 that can be printed with either a grayscale print mode or a color print mode. In printer embodiments that do not support print mode switching, it would be necessary to print the entire page using a color print mode because the page contains colored elements (colored logo 105 and colored text 110). This would correspond to the case illustrated in FIG. 1. For printer embodiments that support print mode switching, printing swaths which overlap the colored print data region 120 must be printed with a color print mode, while printing swaths that overlap only the grayscale print data region 125 can be printed with a grayscale print mode. This would correspond to the case illustrated in FIG. 2.

At the right of each of the two figures is a schematic illustration of the image being printed in a sequence of printing swaths. For ease of representation, the page 100 is shown as being stationary in FIGS. 1 and 2, while the printing swaths are shown as advancing successively downward relative to page 100. In actuality in a carriage printer, the page of recording medium is successively advanced into the printing zone for the printing of each swath.

The sequence of printing swaths is denoted as S1 (first swath), S2 (second swath), and so forth. As can be seen, for the 2-pass color print mode printing of page 100 in FIG. 1, fifteen swaths are required to print the image. By comparison in FIG. 2, for printing page 100 using print mode switching with a printhead nozzle array length that is the same as in FIG. 1, only eleven swaths are required to print the image, representing a printing throughput improvement of approximately 25%.

Taking a closer look at page 100 of FIGS. 1 and 2, it can be seen that in a portion of a swath or swaths (e.g. S2 and S3) that will print colored logo 105 on the right-hand side of page 100, there is also a line of black text 103 that is printed with the same printing swaths S2 and S3. Colored print data region 120 can thus include black print data, such as black text 103, as in the colored print data region 120 including colored logo 105. Alternatively, colored print data region 120 can include only color print data, as in the colored print data region 120 including colored text 110. Grayscale print data region 125 of page 100 includes only black text 102. A colored print data region 120 is defined herein as a region that is printed using swath(s) where there is at least some color print data, while a grayscale print data region is defined herein as a region that is printed using swath(s) where there is only grayscale print data.

In both FIG. 1 and FIG. 2, the printing begins in a 2-pass color print mode because there is a colored print data region 120 near the top of page 100. Prior to printing swath S1, page 100 is advanced until half of the printhead nozzle array is positioned over the recording medium. The other half of the printhead in swath S1 is represented by unused printhead portion 135. Printing swath S1 is then printed as a color print mode swath 130. A color print mode page advance 140 is then performed and a second printing swath S1 is printed as a color print mode swath 130.

In FIG. 1, page 100 is printed entirely in a 2-pass color print mode, so that all fifteen swaths are color print mode swaths 130, a color print mode page advance 140 being performed after each printing swath. At the bottom of the page at printing swath S14, the recording medium has advanced past some of the nozzles in the printhead nozzle array, so that there are unused printhead portions 135 for both swaths S14 and S15.

In the print mode switching example of FIG. 2, swaths S1 and S2 are printed in a 2-pass mode, just as they were in FIG. 1, with a color print mode page advance 140 performed after each swath. Printing swath S3 is a transition color print mode swath 145, where one portion of the printhead nozzle array completes the second pass of 2-pass color printing for the colored print data region 120, and the other portion includes an unused printhead portion 135. After printing swath S3, there is only black text 102 until reaching the colored text 110 near the bottom of the page. Therefore swaths S4 through S8 can be printed as single-pass grayscale print mode swaths 230, with a grayscale print mode page advance 240 preceding each of these swaths. Grayscale print mode page advance 240 for single-pass grayscale printing is substantially twice as large as color print mode page advance 140 for 2-pass color printing. Swath S9 is a transition color print mode swath 145 where one portion of the printhead nozzle array prints the first pass of the 2-pass color print mode for the colored print data region 120 containing the colored text 110, and the other portion includes an unused printhead portion 135. Printing swaths S10 and S11 are both 2-pass color print mode swaths 130, both including unused printhead portions 135 where the printhead extends beyond the bottom of the page 100.

In order to implement the print mode switching method of FIG. 2, it is necessary to determine whether upcoming swaths should be printhead in a color print mode or a grayscale print mode. To make this determination, it is necessary to scan the upcoming print data to see if the print data for upcoming print swaths includes any color print data. Such data scanning operations require both time and processor power.

The above-cited U.S. Pat. No. 5,600,353 indicates that "the data received by the printer is stored in printer memory, and is scanned in advance before the next print pass to determine whether or not color is present in upcoming print data". Similarly, the above-cited U.S. Pat. No. 6,257,698 defines a data segment to be a set of raster lines that correspond to the paper advance. In order to determine the appropriate print mode, the printer receives a first data segment and buffers it. It then counts the number of pixels of color and black in the data segment, determines a truth table denoting if color and black exists within a data segment, sets up masks needed to print a given print mode, prints the swath and advances the paper, and repeats the process until the end of the page.

In order to take full advantage of the printing throughput increases made possible by print mode switching, it is necessary to be able to scan an upcoming data segment for color print data within the time it takes to print the current printing swath and turn the printhead around to prepare for printing the next swath. In some applications, the carriage speed is sufficiently fast and acceleration/deceleration of the carriage is sufficiently high that there is not enough time to complete the data scan, so that a slight delay of up to 25 msec, for example, may be taken at the end of the swath in order to complete the data scan. If the page is printed in 20 swaths, that can waste a total of one half second per page, which can have a significant impact on printing throughput. Even in applications where the processor is able to keep up with the data scan rate required, it requires a significant amount of processor power, which can then not be available for other printer functions, such as for downloading print data from a host computer.

What is needed is a more efficient way of scanning print data in preparation for print mode switching, so that printing throughput is not compromised and so that demand on processor bandwidth is not excessive.

SUMMARY OF THE INVENTION

The present invention represents a method for printing images on an inkjet printer having a grayscale print mode and a color print mode, the inkjet printer including a printhead having a plurality of nozzles which moves laterally across a receiver to print swaths of image data and being adapted to use different print modes to print different swaths of image data, comprising using a processor to perform the steps of:

performing an inspection process to inspect lines of image data in an inspection region downstream from a swath of image data currently being printed, the inspection region being a set of consecutive lines of image data relevant to determining whether a future swath should be printed in the grayscale print mode or the color print mode, including:

inspecting the lines of image data in the inspection region one line at a time according to a predetermined inspection sequence;

determining whether an inspected line contains any pixels to be printed with color ink, and if so terminating the inspection process and designating that the future swath is to be printed with the color print mode;

otherwise, if none of the lines are found to contain any pixels to be printed with color ink, designating the future swath to be printed with the grayscale print mode; and printing the future swath of image data using the designated print mode.

This invention has the advantage that the processing time required to inspect the lines of image data in the inspection region in order to enable mode-switching within a page is reduced by terminating the inspection process when any pixels to be printed with color ink are detected.

It has the additional advantage that using a non-monotonic inspection sequence, where at least some sequentially searched lines of image data are spaced apart from each other, can further reduce the time required by the inspection process by increasing the likelihood that any pixels to be printed with color ink are detected earlier in the inspection process.

It has the further advantage that the processing time saved by terminating the inspection process can be devoted to other tasks such as downloading additional swaths of image data. This can significantly reduce the amount of time needed for a host computer to send a print job to the inkjet printer.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 3:
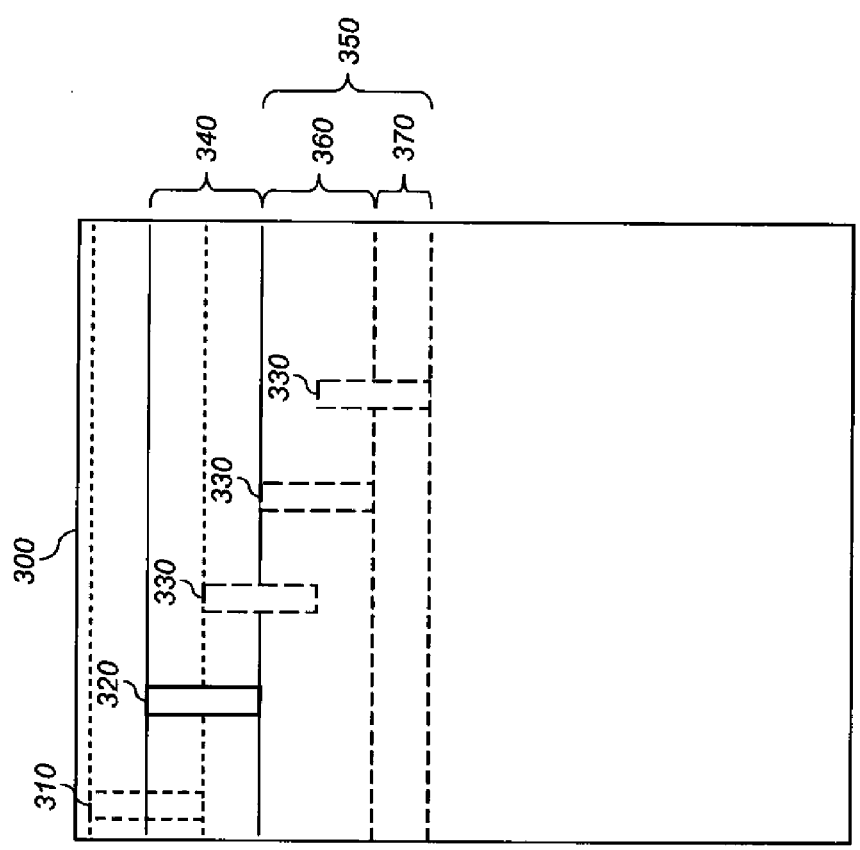
FIG. 3 is a diagram illustrating an inspection region which is searched to determine a print mode to be used for a future printing swath.

To support a configuration where print mode switching is used within a page to improve the page throughput, it is necessary to inspect the image data for future swaths to determine whether it contains any pixels that are to be printed with color ink, or whether it only contains pixels that can be printed with black ink. To illustrate this, FIG. 3 shows an example of a page 300, being printed using a series of swaths. The page is currently being printed in a 2-pass color print mode where the printhead is advanced by approximately half of a head height for each swath. A previous swath 310 has already been printed at the indicated vertical printhead position. A current swath 320 is currently being printed in a current swath region 340. In order to determine whether future swaths 330 should be printed using the 2-pass color print mode or a 1-pass grayscale print mode, it is necessary to determine whether there are any pixels that must be printed with color ink within an inspection region 350 downstream from the current swath 320. The inspection region 350 corresponds to the set of consecutive lines of image data relevant to determining whether the future swath should be printed in the grayscale print mode or the color print mode. There is a minimum size needed for a grayscale print data region in order to realize any throughput improvement by switching to a grayscale print mode. This minimum size defines an inspection region 350 containing lines of image data that must be examined to determine whether they contain any colored image pixels. Inventors have experimentally determined that the size of the inspection region 350 needs to be approximately 1.5 printhead heights for a print mode switching configuration using a 2-pass color print mode and a 1-pass grayscale print mode. The optimal size of the inspection region 350 will generally be a function of the number of passes in the grayscale print mode and the color print mode. The optimal size of the inspection region 350 can be determined experimentally by analyzing sample documents having a variety of grayscale and color print data region sizes using different inspection region sizes to determine the inspection region size that minimizes the number of swaths.

At the time when the previous swath 310 was being printed, a corresponding inspection region was searched, which would have included previously inspected region 360. If it was determined that there were no color pixels in the previously inspected region 360, then it would only be necessary to search uninspected region 370 to look for any color image pixels.

Figure 4:
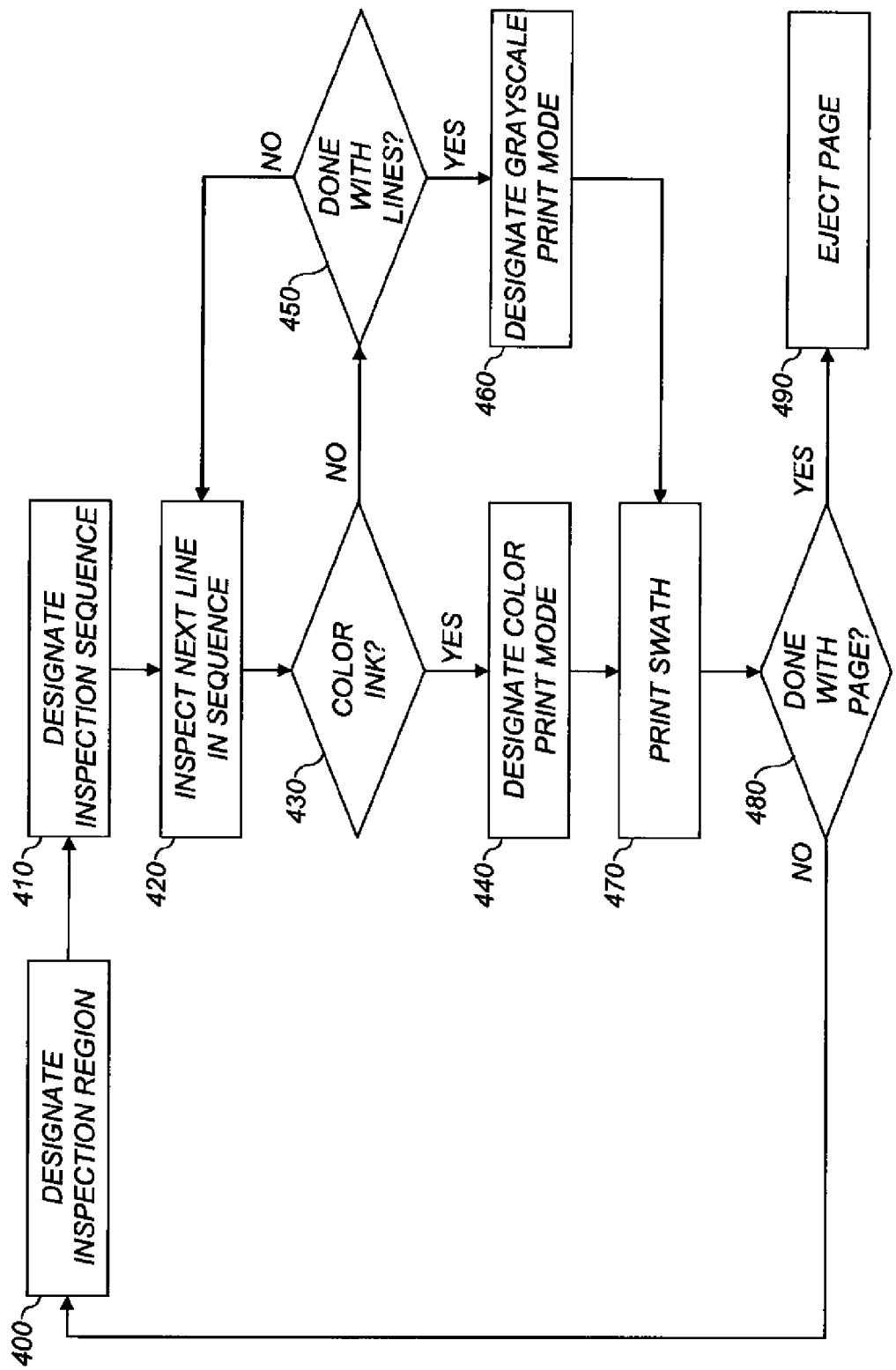
FIG. 4 is a flow diagram for a preferred embodiment of the present invention.

The present invention will now be described with reference to FIG. 4, which shows a flow diagram of a method for printing images on an inkjet printer having a grayscale print mode and a color print mode according to the present invention. A designate inspection region step 400 is used to designate an inspection region that must be inspected to determine whether a future swath should be printed using the grayscale print mode or the color print mode. For the present example, it will be assumed that the grayscale print mode is a 1-pass print mode, the color print mode is a 2-pass print mode, and that the inspection region corresponds to 1.5 printhead heights. As discussed earlier, the optimal size of the inspection region may be different for other print mode configurations.

Before printing the first swath at the top of the page, a full inspection region (e.g., 1.5 printhead heights) at the top of the page must be inspected. As discussed earlier with respect to FIG. 3, it may only be necessary to inspect a portion of the full inspection region (uninspected region 370) if it has been previously determined that no color pixels are found in the previously inspected region 360 (FIG. 3). For the remainder of this discussion the image region that must be inspected for a particular swath will be referred to as the inspection region, whether it includes the full inspection region, or only an uninspected portion.

Next, a designate inspection sequence step 410 is used to designate an order that the lines of image data in the inspection region will be inspected. There are many different strategies that can be used to define inspection sequences in accordance with the present invention. A number of different examples will be described later with respect to FIGS. 5A-5E. Preferably, the inspection sequence will be a non-monotonic inspection sequence where at least some sequentially searched lines of image data are spaced apart from each other. This has the advantage that fewer lines of image data will need to be searched on the average, and therefore will increase the speed of the inspection process.

Once the inspection sequence has been defined, an inspect next line in sequence step 420 is used to inspect the first line in the inspection sequence. The inspect next line in sequence step 420 searches through all of the pixels in the line of image data to determine whether any of the pixels are to be printed with color ink (e.g., cyan, magenta or yellow), or whether they can all be printed using only black ink.

A color ink test 430 is used to direct the flow of the algorithm depending on whether or not any pixels required color ink. If any pixels required color ink, the inspection process is terminated and a designate color print mode step 440 is used to designate that the future swath is to be printed with the color print mode. Otherwise, a done with lines test 450 is used to determine whether all of the lines of image data in the inspection region have been inspected. If there are still more lines of image data to be inspected, the inspect next line in sequence step 420 is called to inspect the next line of image data in the inspection sequence.

If the done with lines test 450 determines that all of the lines of image data in the inspection sequence have been inspected without detecting any pixels to be printed with color ink, then a designate grayscale print mode step 460 is used to designate that the future swath should be printed with the grayscale print mode. A print swath step 470 is then used to print the next swath according to the designated print mode (either the color print mode or the grayscale print mode).

Figure 1:
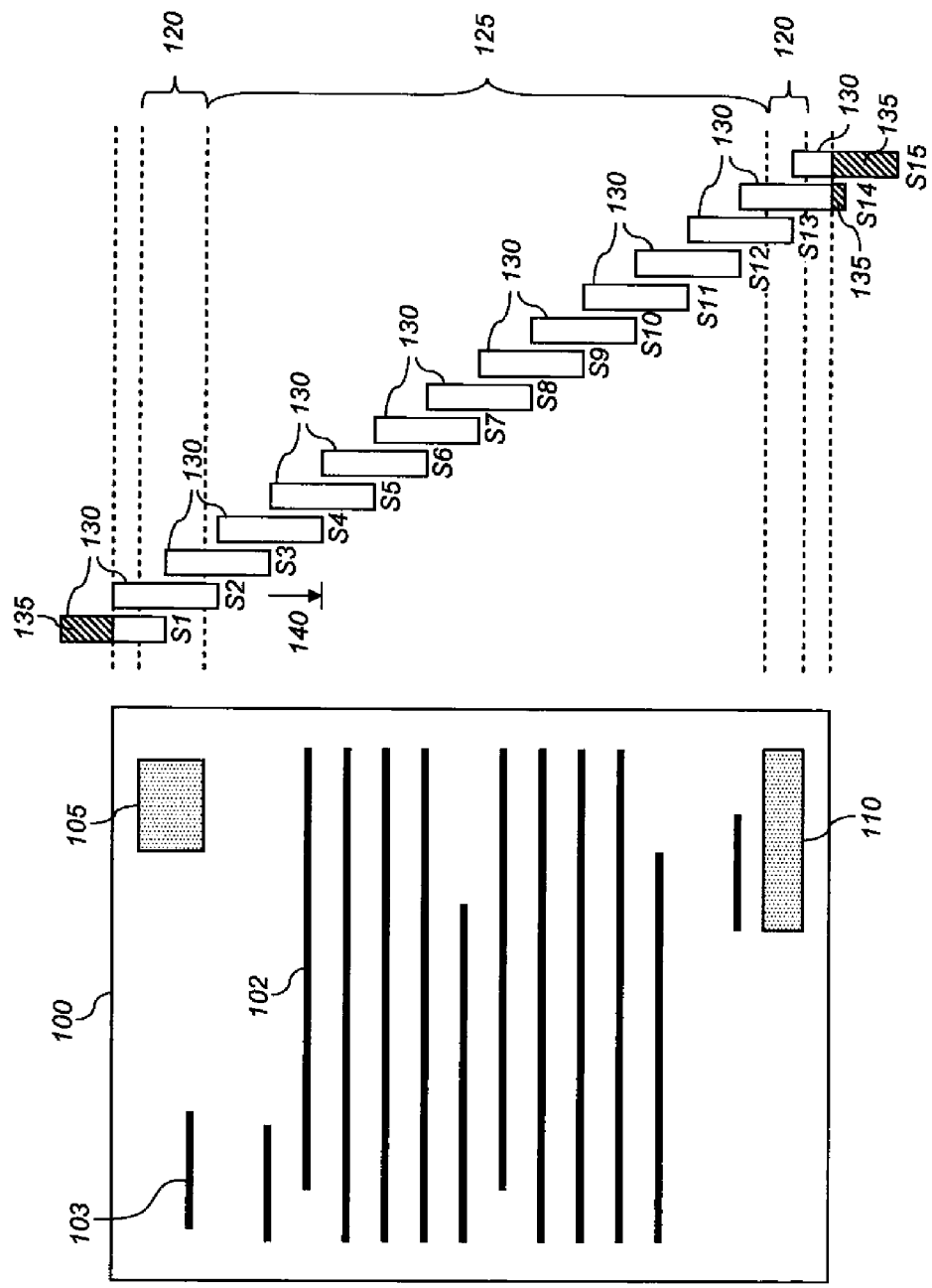
FIG. 1 is a diagram illustrating printing a page using a 2-pass color print mode.
Figure 2:
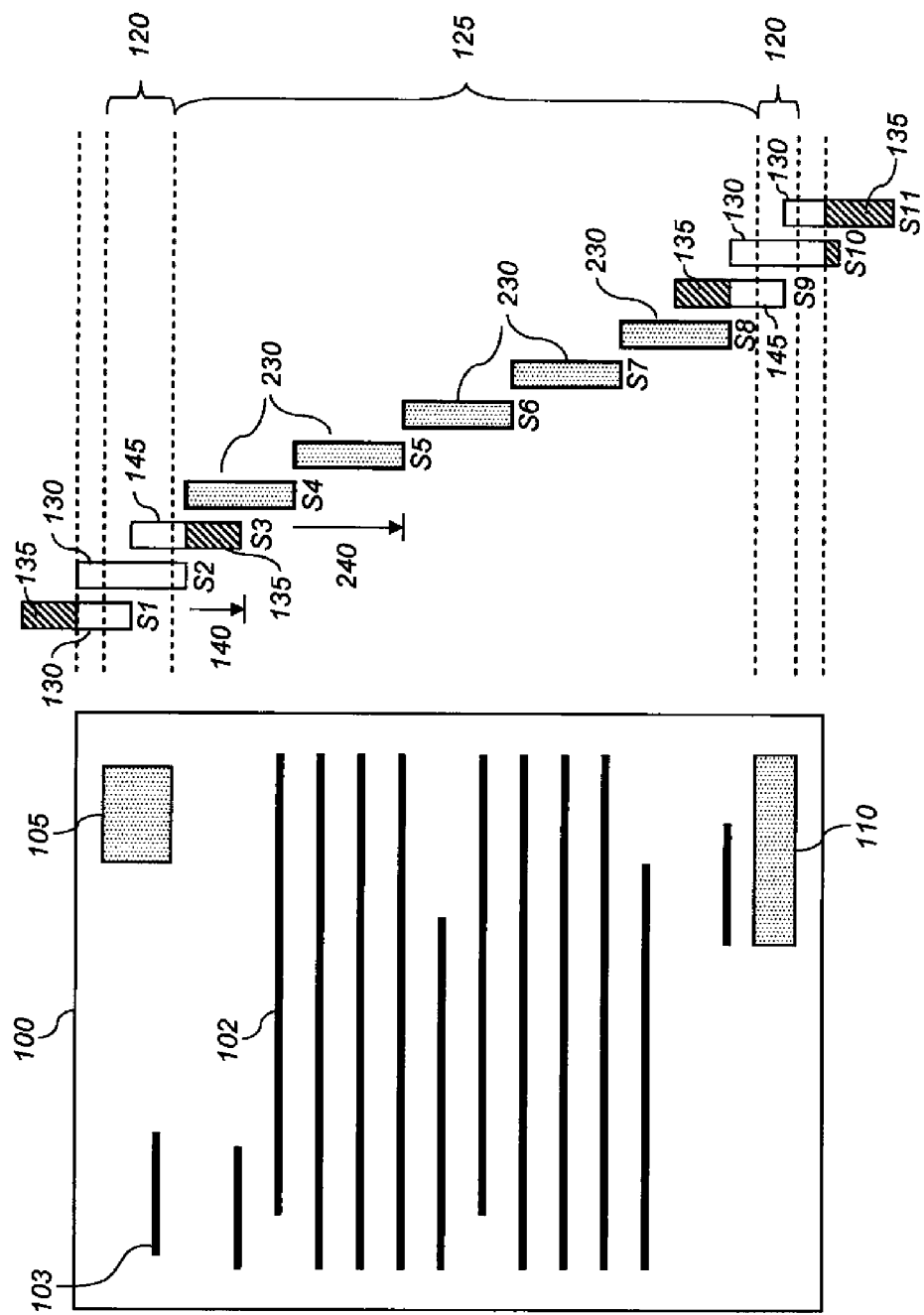
FIG. 2 is a diagram illustrating pint a page using print mode switching.

As was discussed with reference to FIG. 2, if the current swath is a color print mode swath, and the future swath is designated to use the grayscale print mode, it may be necessary to complete the printing of the colored print data region by printing an additional transition color print mode swath 145 (FIG. 2) before printing the future swath with the grayscale print mode.

Similarly, if the current swath is a grayscale print mode swath and the future swath is designated to use the color print mode, the color print mode swath will generally contain an unused printhead portion 135 (see swath S9 in FIG. 2) in order to transition into the 2-pass color print mode.

A done with page test 480 is used to determine whether there are additional swaths of image data that need to be printed. If the done with page test 480 determines that the printing process is not done, flow returns to the designate inspection region step 400, which designates the inspection region for the next swath. Once all of the swaths have been printed, an eject page step 490 is called to eject the completed page from the inkjet printer.

Examples of different inspection sequences that can be used in accordance with the present invention will now be described with reference to FIGS. 5A-5E. For illustration purposes, these examples show an inspection region 500 having 16 lines of image data. In an actual inkjet printer, the size of the inspection region will generally contain a much larger number of lines (i.e., 1.5×the number of active nozzles in the printhead). In these examples, the inspection region 500 includes a line of grayscale text 505 to be printed with black ink and a line of colored text 510 to be printed with color inks.

Figure 5A:
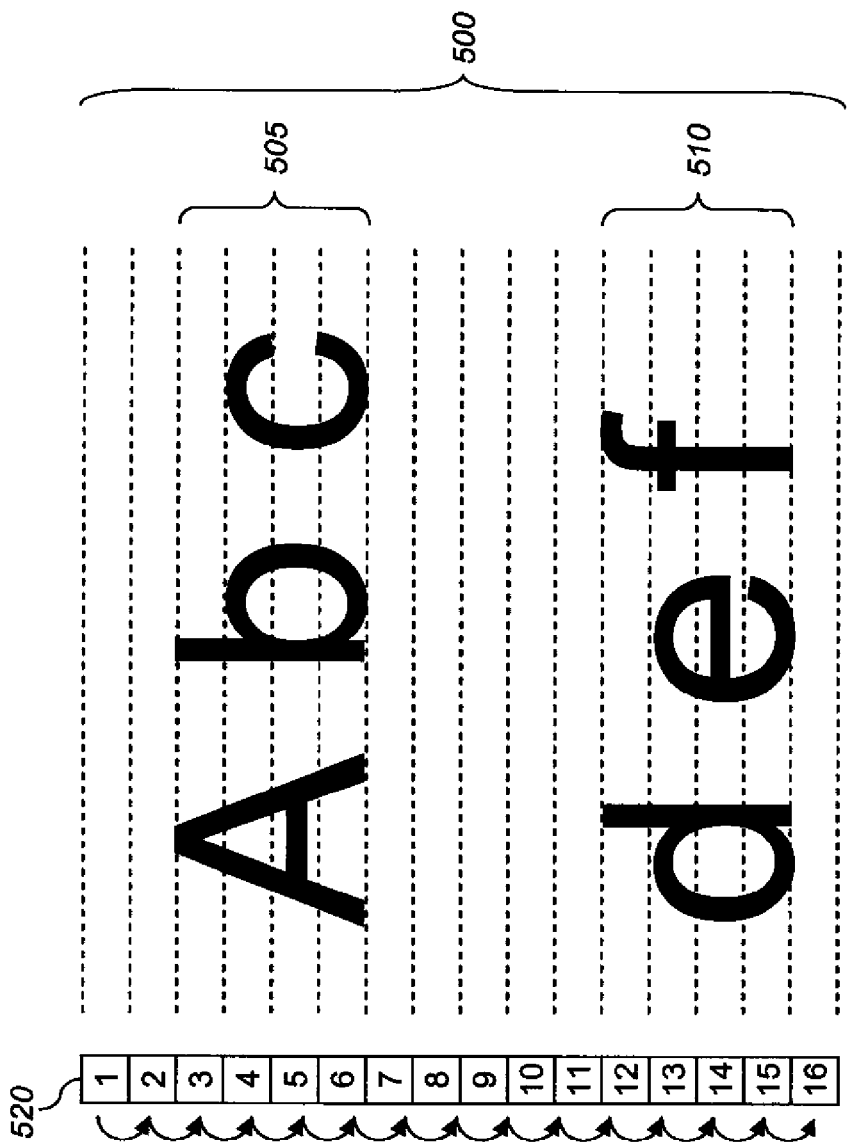
FIG. 5A is a diagram illustrating a monotonic line sequence.

In FIG. 5A a simple inspection sequence using a monotonic line sequence 520 is illustrated. The numbers in the boxes indicate the order that the line is searched in the inspection sequence. Line 1 is searched first, line 2 is searched second, and so on. In this example, the lines of image data are inspected one at a time starting at the top of the inspection region 500, and working down one line at a time. In this case, it would be necessary to search 12 lines of image data before detecting that the inspection region 500 contained pixels to be printed with color ink and terminating the inspection process. This would result in a 25% reduction in the time needed to inspect the lines of image data in the inspection region 500.

While this savings can be significant, other inspection sequences can be used which increase the probability that any pixels to be printed with color ink are detected earlier in the search sequence. In preferred embodiments of the present invention, a non-monotonic inspection sequence is used such that at least some sequentially searched lines of image data are spaced apart from each other. This reflects the fact that most colored text and objects in a printed page tend to be more than 1 pixel in height. Therefore, if one line is found to contain only grayscale pixels, it is likely that the nearby lines also would contain only grayscale pixels. Therefore, it is more likely to find a colored pixel in lines that are spaced apart from the previously inspected lines.

Figure 5B:
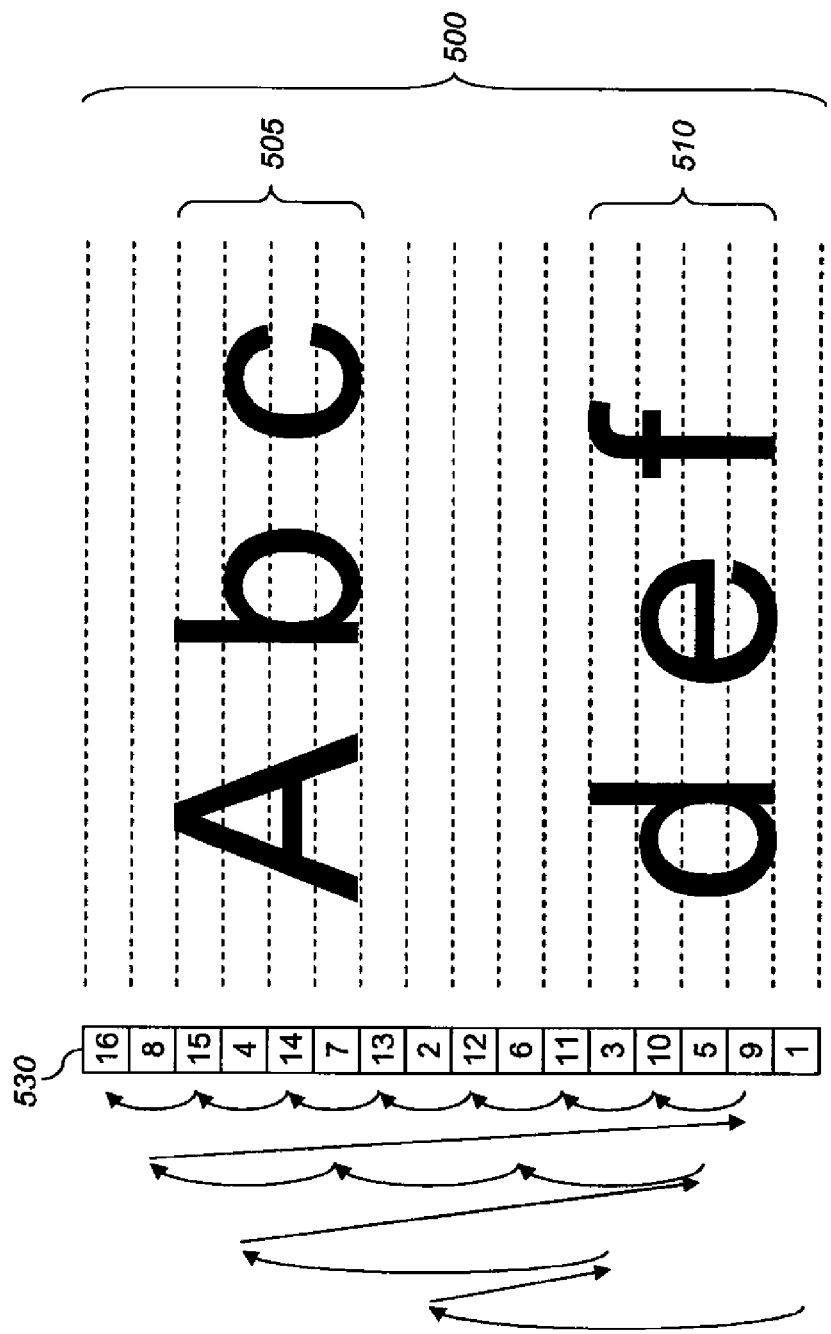
FIG. 5B is a diagram illustrating a binary tree line sequence.

FIG. 5B shows an example of a non-monotonic inspection sequence using a binary tree line sequence 530. For a binary tree line sequence, the inspection region 500 is subdivided using increasingly smaller intervals until all of the lines have been inspected. In this example, the first line to be inspected is the line at the far end of the inspection region 500. Next, the line in the center of the inspection region 500 is inspected, subdividing the inspection region 500 into bottom and top halves. Next lines in the center of the bottom and top halves are inspected, subdividing the inspection region 500 into quarters. This subdivision process continues until all of the lines of inspection region 500 have been inspected. In this example, it is only necessary to inspect 3 lines of image data before detecting that the inspection region 500 contained pixels to be printed with color ink and terminating the inspection process. This would result in saving more than 81% of the time in the inspection process.

Figure 5C:
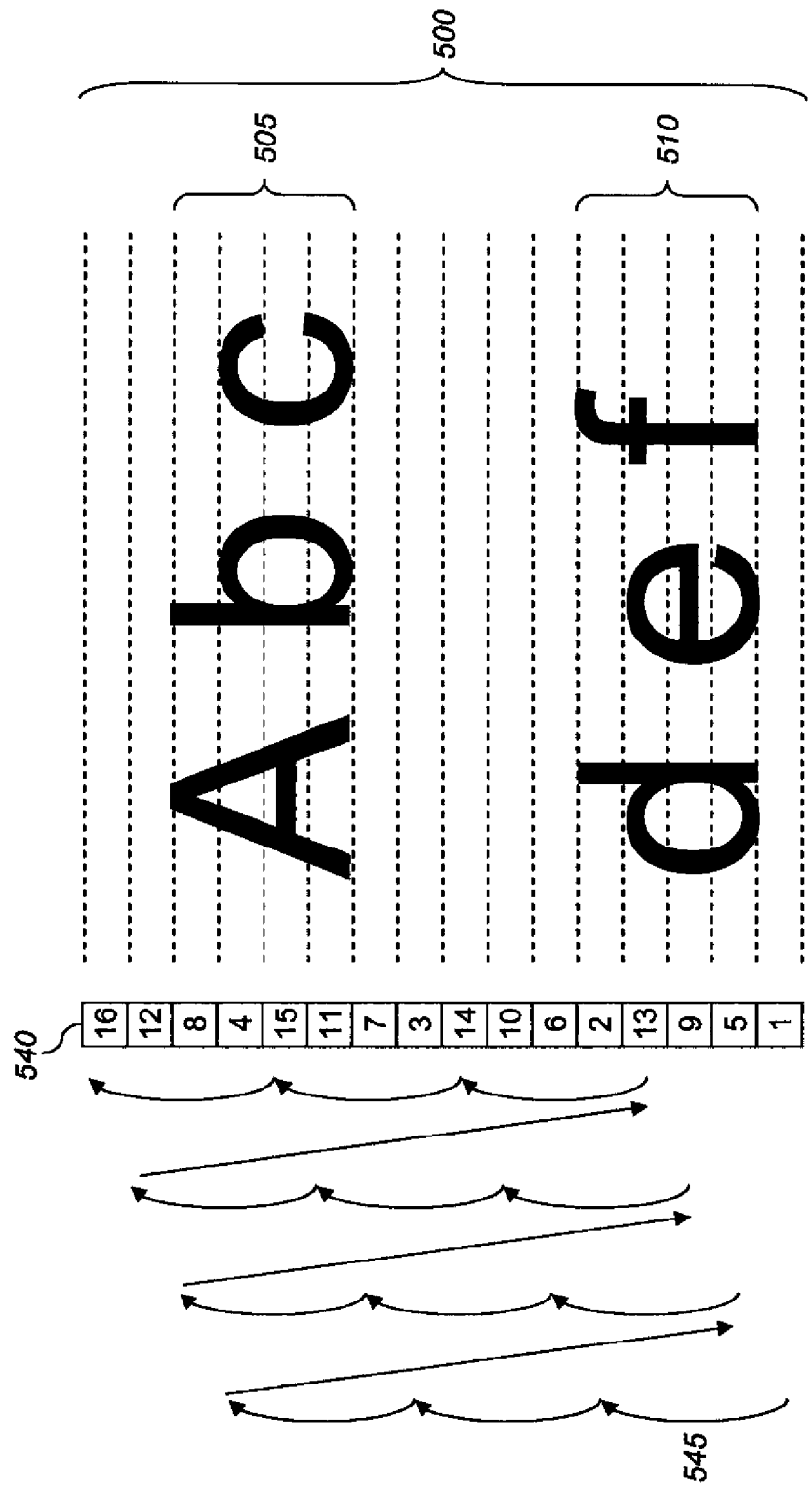
FIG. 5C is a diagram illustrating a coarse/fine line sequence.

FIG. 5C shows an example of a non-monotonic inspection sequence using a coarse spacing line sequence 540. With this approach, the inspection sequence first steps through the lines in the inspection region 500 using a coarse spacing interval 545. Once a first pass has been taken through the inspection region 500, the remaining lines are inspected by offsetting the starting line by one and stepping through the inspection region 500 with the same coarse spacing interval 545. This is repeated until all of the lines in the inspection region have been inspected. In this example, it is only necessary to inspect 2 lines of image data before detecting that the inspection region 500 contained pixels to be printed with color ink and terminating the inspection process. This would result in saving more than 87% of the time in the inspection process.

In some embodiments of the present invention, the coarse spacing interval 545 is chosen to correspond to a fraction of a typical text line spacing for a small font size. For example, one-half of the line spacing for a single-spaced 8-pt font would give a distance interval of approximately 1/16 inch. For a printhead having 1200 nozzles/inch, this would correspond to a coarse spacing interval 545 of 75 lines. Using this approach increases the probability that a single line of colored text will be detected during the first pass through the inspection region 500. Preferably, the distance interval can be chosen to be between 0.01 inches and 0.10 inches.

Figure 5D:
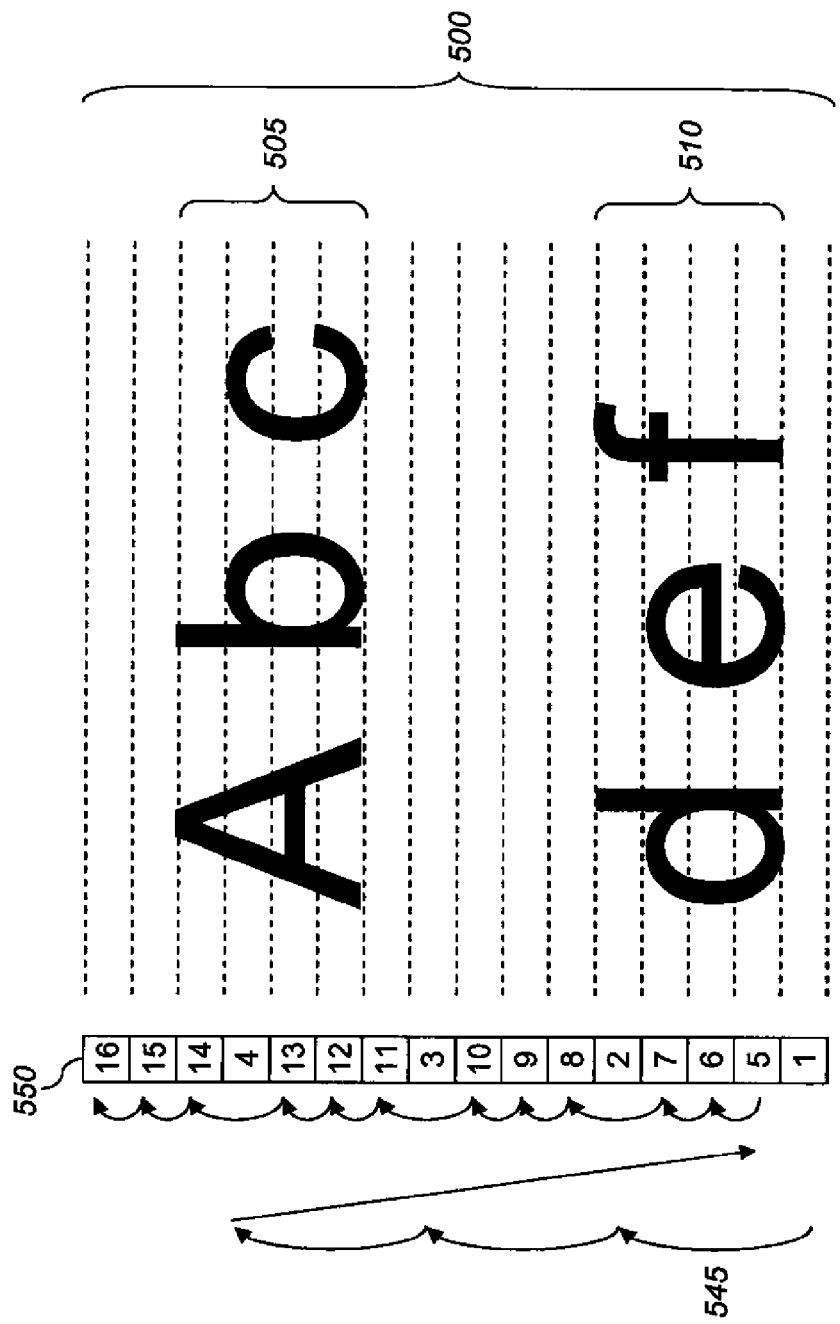
FIG. 5D is a diagram illustrating an alternate coarse/fine line sequence.

FIG. 5D illustrates a course spacing line sequence 550, which is an alternate embodiment of an inspection sequence using a coarse spacing interval 545. As with the example shown in FIG. 5C, the course spacing line sequence 550 first steps through the lines in the inspection region 500 using the coarse spacing interval 545. The rest of the lines are then inspected by stepping through the uninspected lines in the inspection region 500 one line at a time. In this example, it is only necessary to inspect 2 lines of image data before detecting that the inspection region 500 contained pixels to be printed with color ink and terminating the inspection process. This would result in saving more than 87% of the time in the inspection process.

In can be advantageous to adjust the inspection sequence depending on whether the current swath is a color swath or a grayscale swath. If the current swath is a color swath, then it is generally more likely that the near end of the inspection region contains pixels to be printed with color ink than the far end of the inspection region. This reflects the fact that color regions within a page are generally contiguous. Therefore, it will be more likely to find the pixels to be printed with color ink more quickly if the inspection sequence starts with the lines of image data at the near end of the inspection region.

Figure 5E:
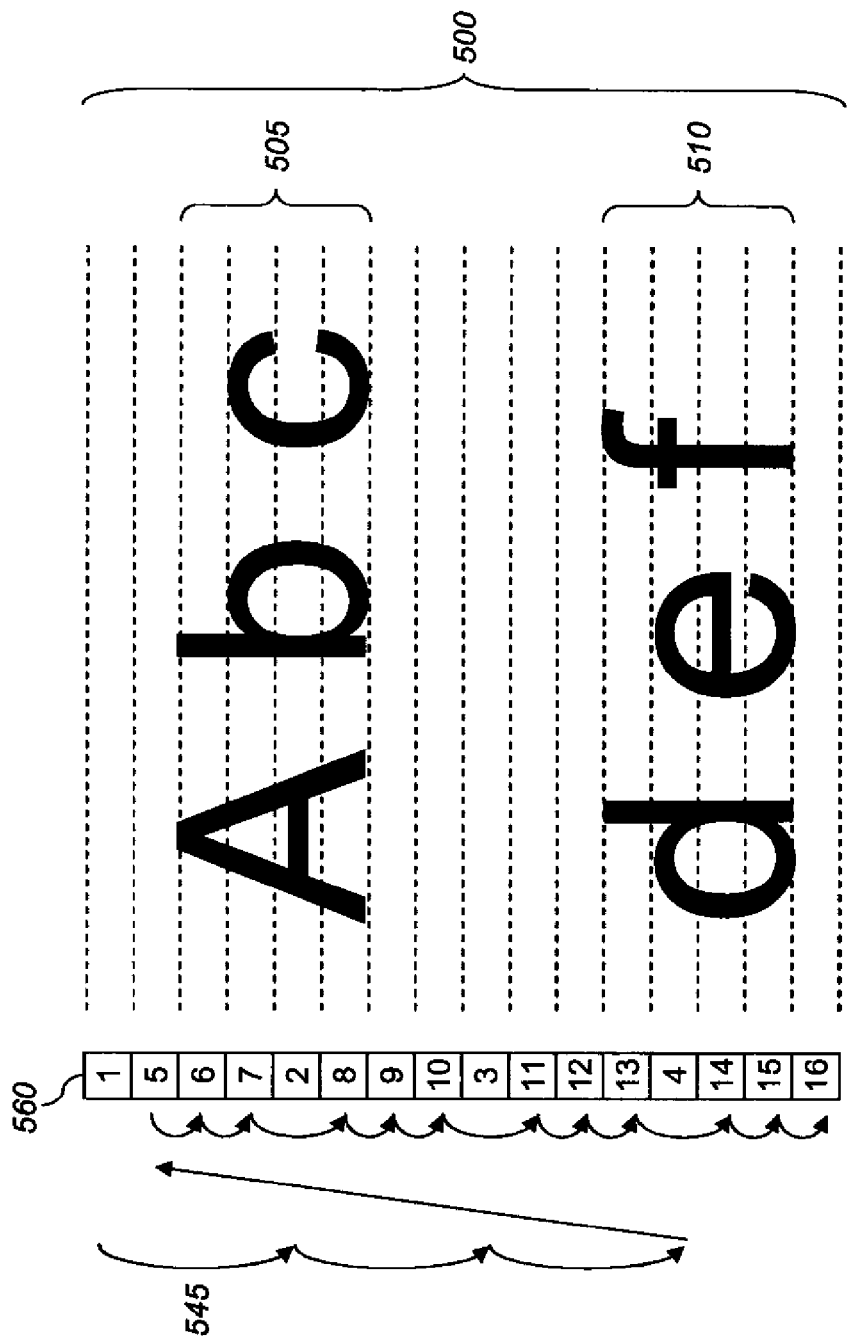
FIG. 5E is a diagram illustrating a coarse/fine line sequence which starts with the lines of image data at the near end of the swath.

FIG. 5E shows a coarse spacing line sequence 560 which is a mirror image of the inspection sequence shown in FIG. 5D. This coarse spacing line sequence 560 first steps through the lines in the inspection region 500 using a coarse spacing interval 545 starting at the near end of the inspection region 500. The rest of the lines are then inspected by stepping through the uninspected lines in the inspection region 500 one line at a time starting at the near end of the inspection region 500. In this example, it is necessary to inspect 4 lines of image data before detecting that the inspection region 500 contained pixels to be printed with color ink and terminating the inspection process. This would result in saving 75% of the time in the inspection process. It would similarly be possible to reverse the search direction for the inspection sequences shown in FIGS. 5A-5C (or any other inspection sequences that were defined) dependent on whether the current swath is a color swath or a grayscale swath.

On the other hand, if the current swath is a grayscale swath, then it is generally more likely that the far end of the inspection region contains pixels to be printed with color ink than the near end of the inspection region. This reflects the fact that grayscale regions within a page are generally contiguous. Therefore, it will be more likely to find the pixels to be printed with color ink more quickly if the inspection sequence starts with the lines of image data at the far end of the inspection region as was shown in the examples of FIGS. 5B-5D.

Figure 6:
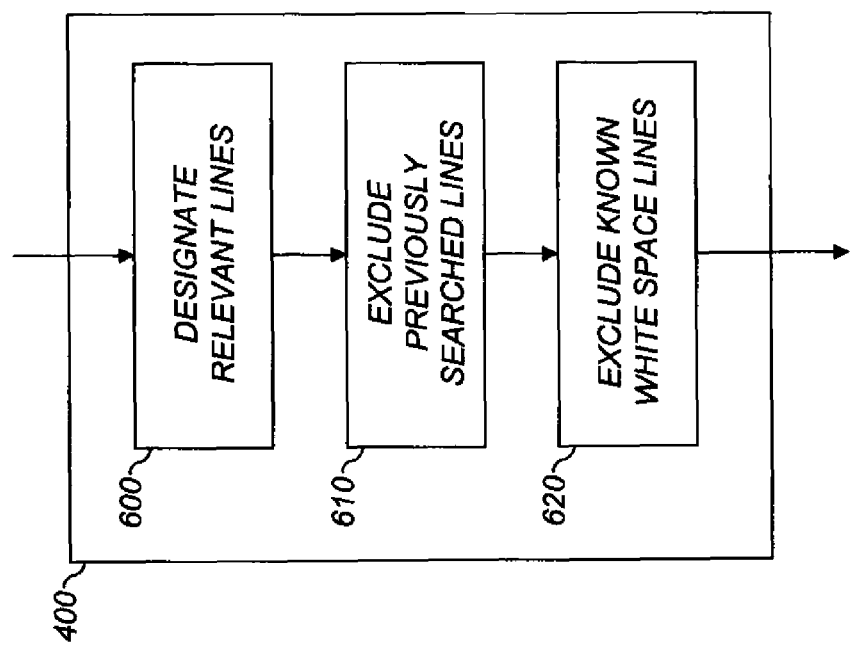
FIG. 6 is a flow diagram showing additional details for the designate inspection region step of FIG. 4.

As was mentioned earlier, the inspection region can be defined to included only lines that have not previously been searched. This can have the desired result of further speeding up the inspection process. FIG. 6 shows additional details of the designate inspection region step 400 from FIG. 4 using this approach. First, a designate relevant lines step 600 is used to designate the lines of image data relevant to determining whether a future swath should be printed in the grayscale print mode or the color print mode. In the example of FIG. 3, the relevant lines would correspond to the inspection region 350.

Next, an exclude previously searched lines step 610 is used to exclude any lines from the inspection region that have already been searched in order to avoid reinspecting them. In one embodiment, individual lines that had previously been searched can be excluded from the inspection region. In other embodiments, search intervals can be defined corresponding to groups of lines. For example, the search intervals could contain groups of lines corresponding to half of the printhead height. If all of the lines in a search interval were inspected and found to contain no color pixels, the search interval can be labeled as a grayscale interval. If a color pixel was found in one of the lines in the search interval, the entire search interval can be labeled as a color interval. Otherwise, the search interval can be labeled as uninspected.

If the relevant lines include a search interval labeled as a color interval, it will not be necessary to inspect any of the lines in the inspection region since it will already be known that the inspection region contains colored pixels. If the relevant lines include a grayscale interval, those lines can be excluded from the inspection region since it is known that they do not contain any color pixels.

In some embodiments, a separate process can be used to determine whether there are any white space regions in the page to enable white space skipping algorithms. The details of such algorithms are beyond the scope of the present invention. However, it should be noted that if any white space data is available that indicates which image lines contain only white space, then this information can be useful to further refine the inspection region. In this case, an exclude known white space lines step 620 can be used to exclude any known white space lines from the inspection region in order to further speed the inspection process.

Figure 7:
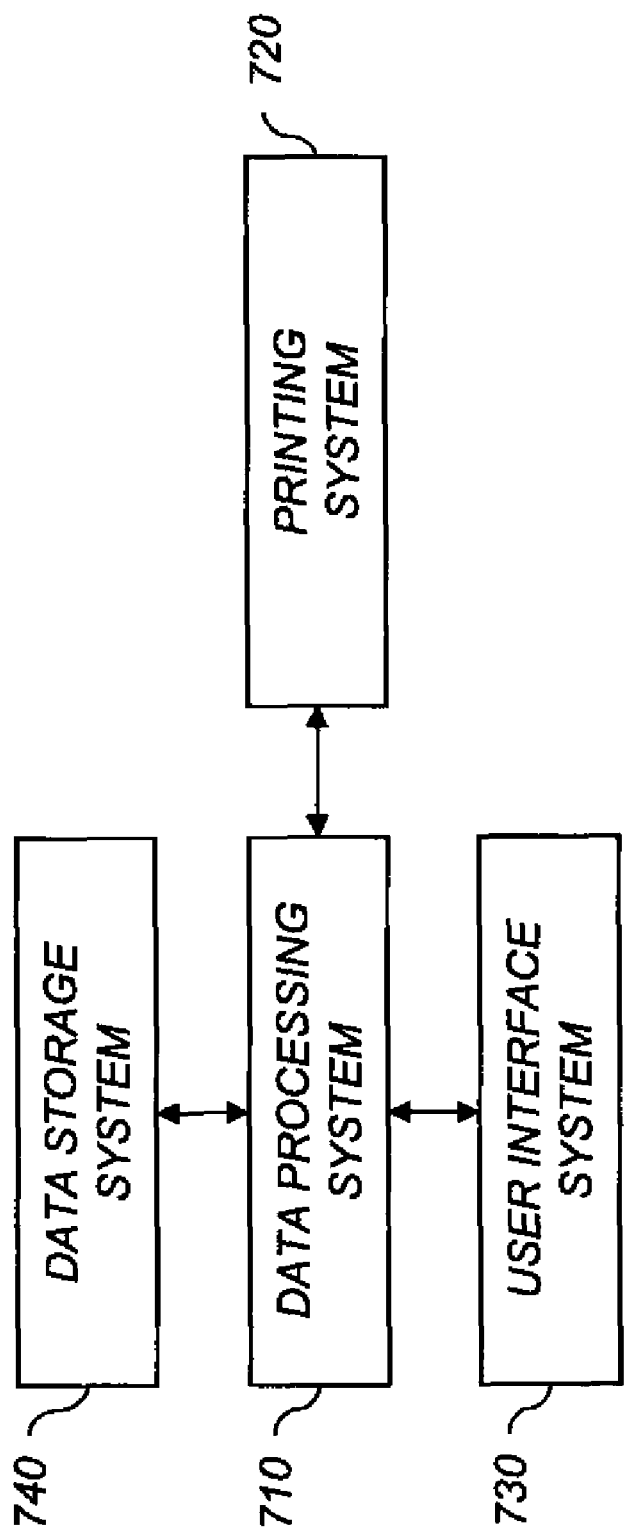
FIG. 7 is a high-level diagram showing the components of a system for printing images on an inkjet printer according to an embodiment of the present invention.

FIG. 7 is a high-level diagram showing the components of a system for printing images on an inkjet printer according to an embodiment of the present invention. The system includes a data processing system 710, a peripheral system 720, a user interface system 730, and a data storage system 740. The peripheral system 720, the user interface system 730 and the data storage system 740 are communicatively connected to the data processing system 710.

The data processing system 710 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 740 includes one or more processor-accessible memories configured to store information, including the information needed to execute the processes of the various embodiments of the present invention, including the example processes described herein. The data storage system 740 may be a distributed processor-accessible memory system including multiple processor-accessible memories communicatively connected to the data processing system 710 via a plurality of computers or devices. On the other hand, the data storage system 740 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 740 is shown separately from the data processing system 710, one skilled in the art will appreciate that the data storage system 740 may be stored completely or partially within the data processing system 710. Further in this regard, although the peripheral system 720 and the user interface system 730 are shown separately from the data processing system 710, one skilled in the art will appreciate that one or both of such systems may be stored completely or partially within the same unit that houses the data processing system 710.

According to the present invention, the peripheral system 720 includes an inkjet printing system having a grayscale print mode and a color print mode, the inkjet printing system including a printhead which moves laterally across a receiver to print swaths of image data and being adapted to use different print modes to print different swaths of image data.

Additionally, the peripheral system 720 may also include one or more additional devices configured to provide digital content records to the data processing system 710. For example, the peripheral system 720 may include digital still cameras, digital video cameras, cellular phones, memory card readers, external storage devices or other data processors. The data processing system 710, upon receipt of digital content records from a device in the peripheral system 720, may store such digital content records in the data storage system 740.

The user interface system 730 may include a mouse, a keyboard, another computer, or any device or combination of devices from which data is input to the data processing system 710. In this regard, although the peripheral system 720 is shown separately from the user interface system 730, elements of the peripheral system 720 may be included as part of the user interface system 730.

The user interface system 730 also may include a display device, a processor-accessible memory, or any device or combination of devices to which data is output by the data processing system 710. In this regard, if the user interface system 730 includes a processor-accessible memory, such memory may be part of the data storage system 740 even though the user interface system 730 and the data storage system 740 are shown separately in FIG. 7.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

100 page
102 black text
103 black text
105 colored logo
110 colored text
120 colored print data region
125 grayscale print data region
130 color print mode swath
135 unused printhead portion
140 color print mode page advance
145 transition color print mode swath
230 grayscale print mode swath
240 grayscale print mode page advance
300 page
310 previous swath
320 current swath
330 future swath
340 current swath region
350 inspection region
360 previously inspected region
370 uninspected region
400 designate inspection region step
410 designate inspection sequence step
420 inspect next line in sequence step
430 color ink test
440 designate color print mode step
450 done with lines test
460 designate grayscale print mode step
470 print swath step
480 done with page test
490 eject page step
500 inspection region
505 grayscale text
510 colored text
520 monotonic line sequence
530 binary tree line sequence
540 coarse spacing line sequence
545 coarse spacing interval
550 coarse spacing line sequence
560 coarse spacing line sequence
600 designate relevant lines step
610 exclude previously searched lines step
620 exclude known white space lines step
710 data processing system
720 peripheral system
730 user interface system
740 data storage system

The invention claimed is:

1. A method for printing images on an inkjet printer having a grayscale print mode and a color print mode, the inkjet printer including a printhead having a plurality of nozzles which moves laterally across a receiver to print swaths of image data and being adapted to use different print modes to print different swaths of image data, comprising using a processor to perform the steps of:

performing an inspection process to inspect lines of image data in an inspection region downstream from a swath of image data currently being printed, the inspection region being a set of consecutive lines of image data relevant to determining whether a future swath should be printed in the grayscale print mode or the color print mode, including:

inspecting the lines of image data in the inspection region one line at a time according to a predetermined inspection sequence, wherein any lines of image data in the inspection region that have previously been inspected are not reinspected;

determining whether an inspected line contains any pixels to be printed with color ink, and if so terminating the inspection process and designating that the future swath is to be printed with the color print mode;

otherwise, if none of the lines are found to contain any pixels to be printed with color ink, designating the future swath to be printed with the grayscale print mode; and printing the future swath of image data using the designated print mode.

2. The method claim 1 wherein the inspection sequence is a non-monotonic inspection sequence such that at least some sequentially searched lines of image data are spaced apart from each other by a spacing interval of at least two lines.

3. The method claim 2 wherein the inspection sequence is a binary tree sequence.

4. The method claim 2 wherein the inspection sequence includes first stepping through the lines of image data using a coarse spacing interval then inspecting the rest of the lines.

5. The method claim 4 wherein the coarse spacing interval is chosen to correspond to a fraction of a typical text line spacing for a small font size.

6. The method claim 4 wherein the coarse spacing interval is chosen to be between 0.01 inches and 0.10 inches.

7. The method claim 1 wherein the inspection sequence is a monotonic inspection sequence starting at one end of the inspection region and proceeding to the opposite end of the inspection region.

8. The method claim 1 wherein the inspection sequence starts with the lines of image data at the far end of the inspection region when the current swath is a grayscale swath.

9. The method claim 1 wherein the inspection sequence starts with the lines of image data at the near end of the inspection region when the current swath is a color swath.

10. The method claim 1 wherein any lines of image data in the inspection region that are known to contain only white pixels are not inspected.

11. The method claim 1 wherein the size of the inspection region corresponds to substantially 1.5 times the number of active nozzles in the printhead.

12. An inkjet printer for printing images using a grayscale print mode and a color print mode, comprising:

a printhead having a plurality of nozzles which moves laterally across a receiver to print swaths of image data and being adapted to use different print modes to print different swaths of image data;

a data processor; and a program memory containing executable instructions for causing the data processor to perform the steps of:

using an inspection process to inspect lines of image data in an inspection region downstream from a swath of image data currently being printed, the inspection region being a set of consecutive lines of image data relevant to determining whether a future swath should be printed in the grayscale print mode or the color print mode, including:

inspecting the lines of image data in the inspection region one line at a time according to a predetermined inspection sequence;

determining whether an inspected line contains any pixels to be printed with color ink, and if so terminating the inspection process and designating that the future swath is to be printed with the color print mode;

otherwise, if none of the lines are found to contain any pixels to be printed with color ink, designating the future swath to be printed with the grayscale print mode; and printing the future swath of image data using the designated print mode.

13. A method for printing images on an inkjet printer having a grayscale print mode and a color print mode, the inkjet printer including a printhead having a plurality of nozzles which moves laterally across a receiver to print swaths of image data and being adapted to use different print modes to print different swaths of image data, comprising using a processor to perform the steps of:

performing an inspection process to inspect lines of image data in an inspection region downstream from a swath of image data currently being printed, the inspection region being a set of consecutive lines of image data relevant to determining whether a future swath should be printed in the grayscale print mode or the color print mode, including:

inspecting the lines of image data in the inspection region one line at a time according to a predetermined inspection sequence, wherein the inspection sequence is a non-monotonic inspection sequence such that at least some sequentially searched lines of image data are spaced apart from each other by a spacing interval of at least two lines;

determining whether an inspected line contains any pixels to be printed with color ink, and if so terminating the inspection process and designating that the future swath is to be printed with the color print mode;

otherwise, if none of the lines are found to contain any pixels to be printed with color ink, designating the future swath to be printed with the grayscale print mode; and printing the future swath of image data using the designated print mode.

* * * * *